US006328411B1

(12) United States Patent
Taylor et al.

(10) Patent No.: US 6,328,411 B1
(45) Date of Patent: Dec. 11, 2001

(54) FERRO-FLUIDIC INKJET PRINTHEAD SEALING AND SPITTING SYSTEM

(75) Inventors: Bret K. Taylor, Vancouver; Jefferson P. Ward, Brush Prairie, both of WA (US); Dawn M. Beachnau Hood, Portland, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/430,395

(22) Filed: Oct. 29, 1999

(51) Int. Cl.[7] ................................ B41J 2/165; B41J 2/04; G11B 9/00

(52) U.S. Cl. ................................ 347/29; 347/53; 346/74.2

(58) Field of Search ........................ 347/29, 53; 346/74.2

(56) References Cited

U.S. PATENT DOCUMENTS

| | | | | |
|---|---|---|---|---|
| 3,979,343 | * | 9/1976 | Graham et al. | 260/16 |
| 4,024,548 | | 5/1977 | Alonso et al. | 347/34 |
| 4,045,802 | * | 8/1977 | Fukazawa et al. | 347/29 |
| 4,231,046 | | 10/1980 | Aiba | 347/44 |
| 4,432,004 | | 2/1984 | Glattli | 347/28 |
| 4,849,769 | * | 7/1989 | Dressler | 347/28 |
| 4,947,187 | | 8/1990 | Iwagami | 347/28 |
| 4,951,066 | | 8/1990 | Terasawa et al. | 347/33 |
| 5,051,758 | | 9/1991 | Markham | 347/28 |
| 5,117,244 | | 5/1992 | Yu | 347/29 |
| 5,240,626 | * | 8/1993 | Thakur et al. | 347/53 |
| 5,250,207 | * | 10/1993 | Kormann et al. | 347/53 |
| 5,300,958 | | 4/1994 | Burke et al. | 347/33 |
| 5,341,160 | | 8/1994 | Winslow et al. | 347/86 |
| 5,528,271 | | 6/1996 | Ebisawa | 347/34 |
| 5,614,930 | | 3/1997 | Osborne et al. | 347/33 |
| 5,617,272 | * | 4/1997 | MacLeod et al. | 360/99.08 |
| 5,801,725 | | 9/1998 | Neese et al. | 347/32 |
| 5,914,734 | | 6/1999 | Rotering et al. | 347/33 |
| 6,102,518 | * | 8/2000 | Taylor | 347/29 |

FOREIGN PATENT DOCUMENTS

| | | | |
|---|---|---|---|
| 2457643 | | 6/1976 | (DE) . |
| 59146857 | | 8/1984 | (JP) . |
| 60248356 | | 12/1985 | (JP) . |
| 61230946 | | 10/1986 | (JP) . |
| 04371849-A | * | 12/1992 | (JP) . |
| 143597A | | 5/1994 | (JP) . |

OTHER PUBLICATIONS

British Patent Office Search Report dated Feb. 22, 2001. GB 0026370.7.

* cited by examiner

*Primary Examiner*—N. Le
*Assistant Examiner*—Shih-wen Hsieh
(74) *Attorney, Agent, or Firm*—Flory L. Martin

(57) ABSTRACT

A ferro-fluidic inkjet printhead sealing and spitting system is provided for maintaining inkjet printhead health, prior to and after installation in an inkjet printing mechanism. As a ferro-fluidic capping system for sealing printhead nozzles which eject ink having either polar properties or non-polar properties, the system includes a support structure engageable with the printhead, and a magnetic element supported by the support structure. A ferro-fluidic fluid overlays the magnetic element to seal against the printhead nozzles when the support structure is engaged with the printhead. The ferro-fluidic fluid has polar properties when the ink has non polar properties, and non-polar properties when the ink has polar properties. The ferro-fluidic fluid may be used to receive ink spit from the printhead, or when used with an adhesive tape, to protect an inkjet cartridge during shipping. An inkjet printing mechanism having such a ferro-fluidic system, along with associated methods are also provided.

34 Claims, 8 Drawing Sheets

FERRO-FLUIDIC INKJET PRINTHEAD SEALING AND SPITTING SYSTEM

FIELD OF THE INVENTION

The present invention relates generally to inkjet printing mechanisms, and more particularly to a ferro-fluidic inkjet printhead sealing and spitting system for maintaining inkjet printhead health.

BACKGROUND OF THE INVENTION

Inkjet printing mechanisms use pens which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include an elastomeric capping system which hermetically seals the printhead nozzles from contaminants and drying. To facilitate priming, some printers have elastomeric priming caps that are connected to a pumping unit to draw a vacuum on the printhead. During operation, partial occlusions or clogs in the printhead are periodically cleared by firing a number of drops of ink through each of the nozzles in a clearing or purging process known as "spitting." The waste ink is collected at a spitting reservoir portion of the service station, known as a "spittoon." After spitting, uncapping, or occasionally during printing, most service stations have a flexible elastomeric wiper that wipes the printhead surface to remove ink residue, as well as any paper dust or other debris that has collected on the printhead.

To improve the clarity and contrast of the printed image, recent research has focused on improving the ink itself. To provide quicker, more waterfast printing with darker blacks and more vivid colors, pigment based inks have been developed. These pigment based inks have a higher solids content than the earlier dye-based inks, which results in a higher optical density for the new inks. Both types of ink dry quickly, which allows inkjet printing mechanisms to use plain paper. Unfortunately, the combination of small nozzles and quick-drying ink leaves the printheads susceptible to clogging, not only from dried ink and minute dust particles or paper fibers, but also from the solids within the new inks themselves. Partially or completely blocked nozzles can lead to either missing or misdirected drops on the print media, either of which degrades the print quality. Thus, spitting to clear the nozzles becomes even more important when using pigment-based inks, because the higher solids content contributes to the clogging problem more than earlier dye-based inks.

Challenges were also faced in finding suitable capping strategies for the new pigment based inks, while also adequately capping the multi-color dye based printhead. Capping hermetically seals the area around the printhead nozzles to prevent drying or decomposition of the ink during periods of printer inactivity. The Hewlett-Packard Company's DeskJet® 850C color inkjet printer employed a elastomeric, multi-ridged capping system to seal the pigment based black pen. A spring-biased sled supported both the black and color caps, and gently engaged the printheads to avoid depriming them. A vent system was required including an elastomeric vent plug and a labyrinth vent path under the sled to avoid inadvertent over pressurizations or under pressurizations, like barometric changes in the ambient pressure or from volume changes during the capping process.

Thus, it would be desirable to find new ways of sealing an inkjet printhead, beyond mere modifications of the conventional elastomeric caps, and new ways of dealing with ink spit from printheads, beyond the conventional spittoons, along with new ways of sealing an inkjet printhead prior to installation in an inkjet printing mechanism.

SUMMARY OF THE INVENTION

According to one aspect of the present invention, a ferro-fluidic capping system is provided for sealing nozzles of an inkjet printhead, with the nozzles ejecting ink having either polar properties or non-polar properties. The ferro-fluidic capping system includes a support structure engageable with the printhead, and a magnetic element supported by the support structure. A ferro-fluidic fluid overlays the magnetic element to seal against the printhead nozzles when the support structure is engaged with the printhead. The ferro-fluidic fluid is selected to have polar properties when the ink has non-polar properties, and to have non-polar properties when the ink has polar properties.

According to another aspect of the present invention, a fluidic capping system is provided for sealing ink-ejecting nozzles of an inkjet printhead. The fluidic capping system includes a support structure engageable with the printhead. A fluid is supported by the support structure to seal against the printhead nozzles when the support structure is engaged with the printhead. This fluid is selected to expel ink residue ejected thereon from the printhead.

According to a further aspect of the present invention, a method of sealing an inkjet printhead during periods of inactivity is provided, with nozzles ejecting ink having either polar properties or non-polar properties. The method includes the step of covering the nozzles with a ferro-fluidic fluid selected to have polar properties when the ink has non-polar properties, and to have non-polar properties when the ink has polar properties. In a magnetically biasing step, the ferro-fluidic fluid is magnetically biased during the covering step.

According to an additional aspect of the present invention, a method of handling ink spit from an inkjet printhead is provided, with the ink having either polar properties or non-polar properties. The method includes the step of providing a spit target located to receive ink spit from the printhead. The spit target has a surface of a ferro-fluidic fluid selected to have polar properties when the ink has non-polar properties, and to have non-polar properties when the ink has polar properties. The method includes the steps of spitting ink from the printhead onto the surface of the ferro-fluidic fluid, and magnetically biasing the ferro-fluidic fluid during the spitting step.

According to yet a further aspect of the present invention, an inkjet printing mechanism is provided as including a frame, and a support structure supported by the frame. The printing mechanism has an inkjet printhead with nozzles which eject ink having either polar properties or non-polar properties. The printing mechanism has magnetic element supported by the support structure. A ferro-fluidic fluid overlays the magnetic element. The ferro-fluidic fluid is selected to have polar properties when the ink has non-polar properties, and to have non-polar properties when the ink has polar properties.

According to still another aspect of the present invention, an inkjet cartridge is provided for installation in an inkjet printing mechanism. The cartridge includes a reservoir, and ink contained in the reservoir, with the ink having either polar properties or non-polar properties. The cartridge has a printhead with nozzles for ejecting the ink from the reservoir. The cartridge also has a removable ferro-fluidic sealing assembly sealing the nozzles. The ferro-fluidic sealing assembly includes a support structure removably engageable with the printhead, and a magnetic element supported by the support structure. A ferro-fluidic fluid overlays the magnetic element and seals the nozzles when the support structure is engaged with the printhead. The ferro-fluidic fluid is selected to have polar properties when the ink has non-polar properties, and to have non-polar properties when the ink has polar properties.

An overall goal of the present invention is to provide a printhead service station for an inkjet printing mechanism that facilitates printing of sharp vivid images, particularly when using fast drying pigment based inks, co-precipitating inks, dye based inks, or ultra-fast drying inks, by providing fast and efficient printhead servicing.

Another goal of the present invention is to provide an inkjet printhead sealing system for use before installation in an inkjet printing mechanism.

An additional goal of the present invention is to provide a service station with a new capping system which is more economical, provides better sealing than the earlier elastomeric caps, and in one variation, may be used during shipment before an inkjet cartridge is installed in a printing mechanism.

A further goal of the present invention is to provide a service station with a new capping system which allows wider material and component tolerances to be used in the printing mechanism, while allowing the pens to be situated closer together for a more compact printing unit without suffering cross contamination between adjacent colors.

Still another goal of the present invention is to provide an inkjet printhead capping system which also facilitates printhead spitting, eliminating the earlier costly separate spittoons.

A further goal of the present invention is to provide a method of servicing an inkjet printhead that is expediently accomplished in an efficient manner to preserve printhead health and provide consumers with a reliable, robust printing unit that consistently prints high quality images.

DETAILED DESCRIPTION OF THE PREFERRED EMBODIMENTS

Figure 1:
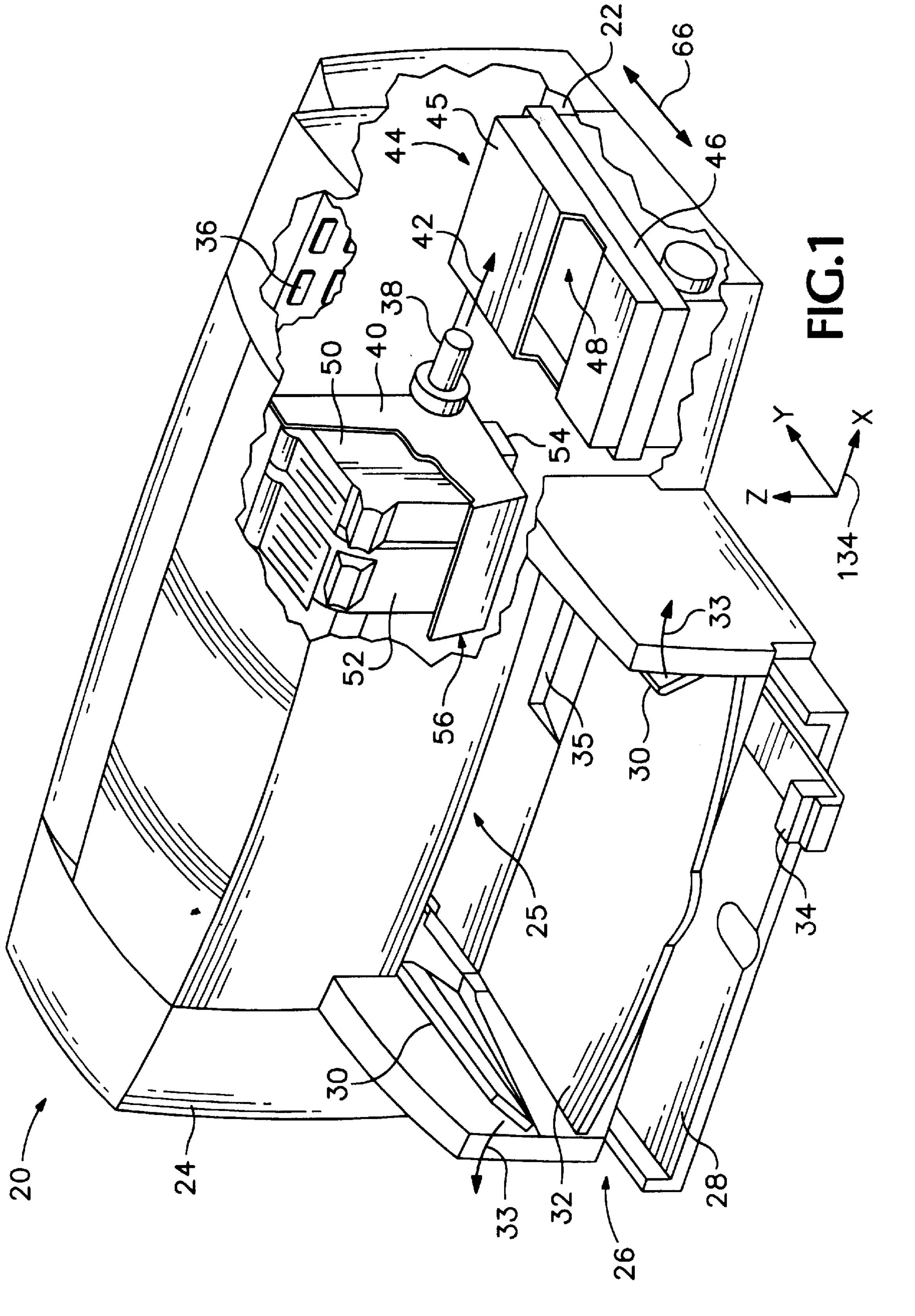
FIG. 1 is a fragmented, partially schematic, perspective view of one form of an inkjet printing mechanism including one form of a ferro-fluidic inkjet printhead sealing and spitting system of the present invention for maintaining inkjet printhead health.

FIG. 1 illustrates an embodiment of an inkjet printing mechanism, here shown as an inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20.

While it is apparent that the printer components may vary from model to model, the typical inkjet printer 20 includes a chassis 22 surrounded by a housing or casing enclosure 24, typically of a plastic material. Sheets of print media are fed through a print zone 25 by an adaptive print media handling system 26, constructed in accordance with the present invention. The print media may be any type of suitable sheet material, such as paper, card-stock, transparencies, mylar, and the like, but for convenience, the illustrated embodiment is described using paper as the print medium. The print media handling system 26 has a feed tray 28 for storing sheets of paper before printing. A series of conventional motor-driven paper drive rollers (not shown) may be used to move the print media from tray 28 into the print zone 25 for printing. After printing, the sheet then lands on a pair of retractable output drying wing members 30, shown extended to receive a printed sheet. The wings 30 momentarily hold the newly printed sheet above any previously printed sheets still drying in an output tray portion 32 before pivotally retracting to the sides, as shown by curved arrows 33, to drop the newly printed sheet into the output tray 32. The media handling system 26 may include a series of adjustment mechanisms for accommodating different sizes of print media, including letter, legal, A-4, envelopes, etc., such as a sliding length adjustment lever 34, and an envelope feed slot 35.

The printer 20 also has a printer controller, illustrated schematically as a microprocessor 36, that receives instructions from a host device, typically a computer, such as a personal computer (not shown). Indeed, many of the printer controller functions may be performed by the host computer, by the electronics on board the printer, or by interactions therebetween. As used herein, the term "printer controller 36" encompasses these functions, whether performed by the host computer, the printer, an intermediary device therebetween, or by a combined interaction of such elements. The printer controller 36 may also operate in response to user inputs provided through a key pad (not shown) located on the exterior of the casing 24. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 38 is supported by the chassis 22 to slideably support an inkjet carriage 40 for travel back and forth across the print zone 25 along a scanning axis 42 defined by the guide rod 38. One suitable type of carriage support system is shown in U.S. Pat. No. 5,366,305, assigned to Hewlett-Packard Company, the assignee of the present invention. A conventional carriage propulsion system may be used to drive carriage 40, including a position feedback system, which communicates carriage position signals to the controller 36. For instance, a carriage drive gear and DC motor assembly may be coupled to drive an endless belt secured in a conventional manner to the pen carriage 40, with the motor operating in response to control signals received from the printer controller 36. To provide carriage positional feedback information to printer controller 36, an optical, magnetic, microwave, or other type of encoder reader may be mounted to carriage 40 to read an encoder strip extending along the path of carriage travel.

The carriage 40 is also propelled along guide rod 38 into a servicing region, as indicated generally by arrow 44, located within the interior of the casing 24. The servicing region 44 houses a service station 45, which may provide various conventional printhead servicing functions. For example, a service station frame 46 holds a group of printhead servicing appliances, described in greater detail below. In FIG. 1, a printhead servicing entrance portal 48 of the service station is shown as being defined by the service station frame 46.

In the print zone 25, the media sheet receives ink from an inkjet cartridge, such as a black ink cartridge 50 and/or a color ink cartridge 52. The cartridges 50 and 52 are also often called "pens" by those in the art. The illustrated color pen 52 is a tri-color pen, although in some embodiments, a set of discrete monochrome pens may be used. While the color pen 52 may contain a pigment based ink, for the purposes of illustration, pen 52 is described as containing three dye based ink colors, such as cyan, yellow and magenta. The black ink pen 50 is illustrated herein as containing a pigment based ink. It is apparent that other types of inks may also be used in pens 50, 52, such as thermoplastic, wax or paraffin based inks, as well as hybrid or composite inks having both dye and pigment characteristics.

The illustrated pens 50, 52 each include reservoirs for storing a supply of ink. The pens 50, 52 have printheads 54, 56 respectively, each of which have an orifice plate with a plurality of nozzles formed therethrough in a manner well known to those skilled in the art. The illustrated printheads 54, 56 are thermal inkjet printheads, although other types of printheads may be used, such as piezoelectric printheads. The printheads 54, 56 typically include substrate layer having a plurality of resistors which are associated with the nozzles. Upon energizing a selected resistor, a bubble of gas is formed to eject a droplet of ink from the nozzle and onto media in the print zone 25. The printhead resistors are selectively energized in response to enabling or firing command control signals, which may be delivered by a conventional multi-conductor strip (not shown) from the controller 36 to the printhead carriage 40, and through conventional interconnects between the carriage and pens 50, 52 to the printheads 54, 56.

Ferro-Fluidic Inkjet Printhead Sealing and Spitting System

Figure 2:
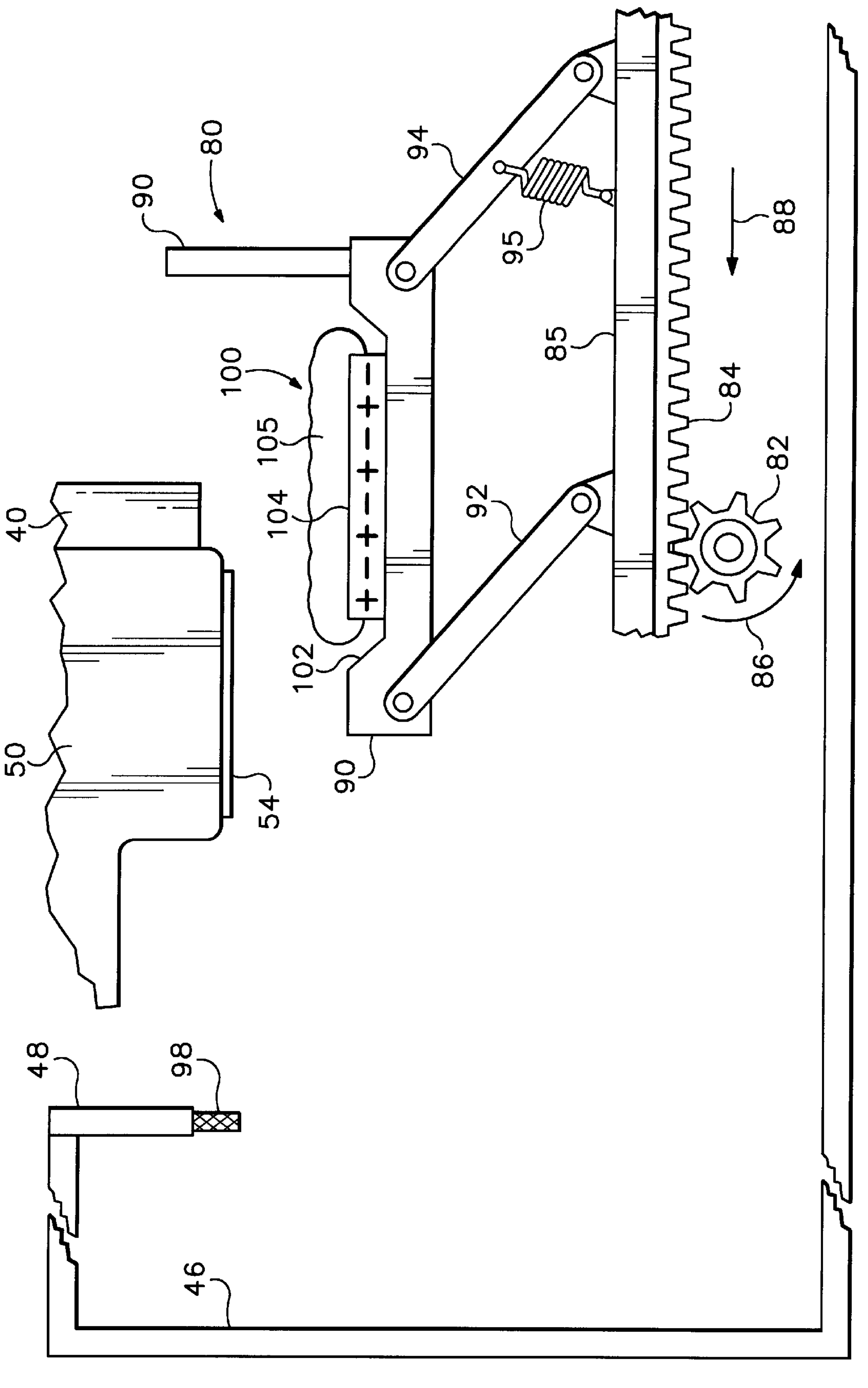
FIG. 2 is a schematic side elevational view of one form of a translationally moveable ferro-fluidic servicing station of FIG. 1 shown prior to capping.
Figure 3:
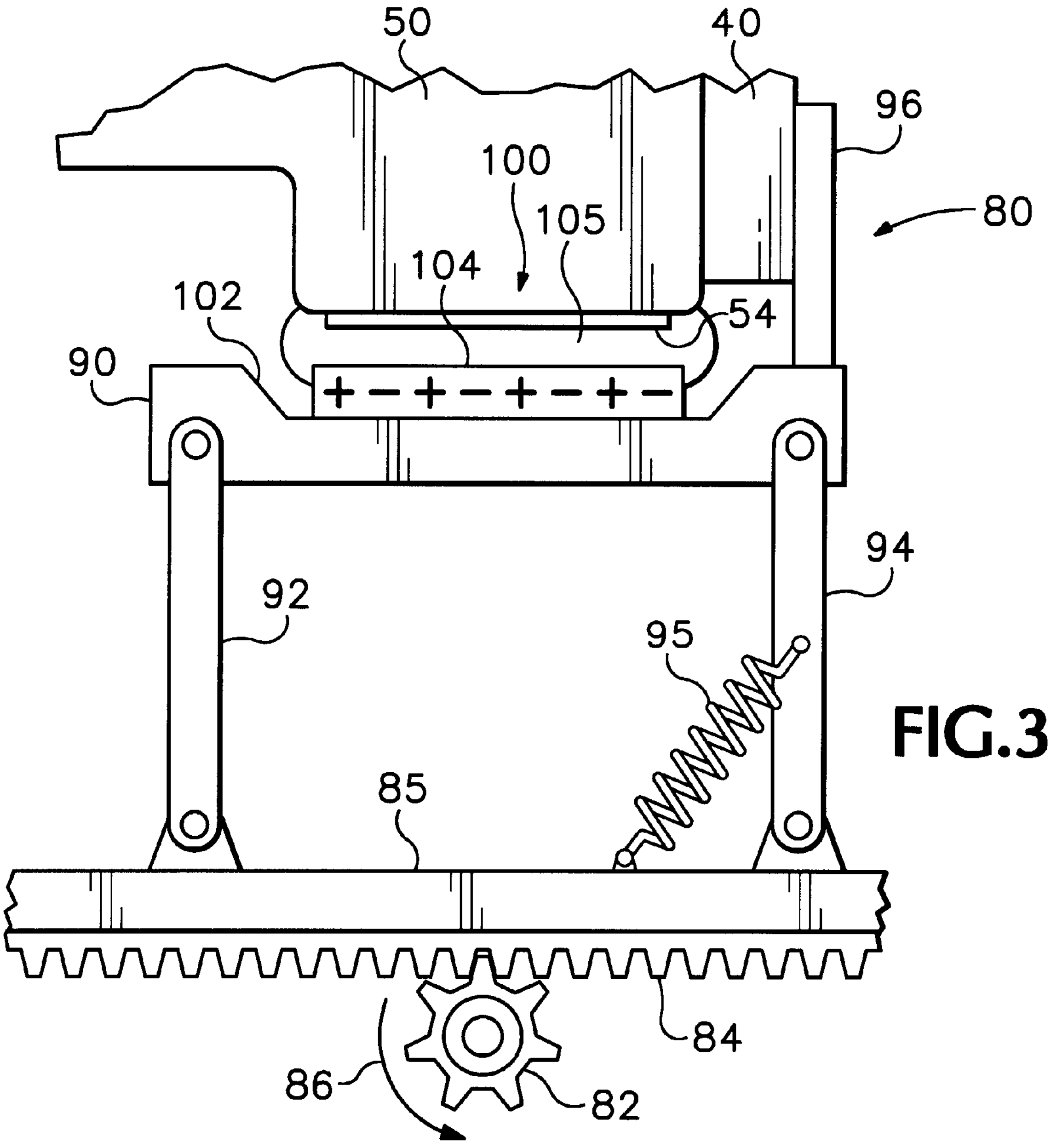
FIG. 3 is a schematic side elevational view of the ferro-fluidic servicing station of FIGS. 1 and 2, shown in a capping position.

FIGS. 2 and 3 illustrate one form of a ferro-fluidic capping and spitting system 80 for inkjet printhead sealing and spitting, constructed in accordance with the present invention as a portion of the service station 45. To service each of the printheads 54, 56 of the pens 50, 52, the service station 45 includes a stepper motor and pinion gear assembly 82 coupled to engage and drive a rack gear 84 located along the underside of a moveable platform or pallet 85. Here, as the gear of assembly 82 rotates in the direction of curved arrow 86, the servicing platform 85 is shown as a translationally moving member, moving to the left as indicated by an arrow 88 in FIG. 2, although a rotary platform, or a combination platform having both rotary and translational motion, may also be used.

The ferro-fluidic service station 80 has a cap sled 90 which may be supported by the pallet 85 in a variety of different ways, here illustrated is a four-bar linkage having a pair of bars 92 and another pair of bars 94 which are pivotally connected to both the pallet 85 and sled 90 as shown in FIGS. 2 and 3. The sled 90 is biased into a rest position as shown FIG. 2 through the use of a biasing member, such as a coil spring 95 which is schematically illustrated as pulling one or more of the pair of support bar links 94 toward sled 85. It is apparent that the biasing spring 95 may be adapted in other ways to draw sled 90 toward the pallet 85 in a rest position, such as disclosed in U.S. Pat. No. 5,614,930, or as first commercially introduced in the Hewlett-Packard Company's DeskJet 720C and 722C models of color inkjet printers. A variety of different service station sleds are known to those skilled in the art, all sharing the feature of being in a rest position as shown FIG. 2, and being in a capping position for sealing a printhead, such as printhead 54, as shown in FIG. 3.

To move from the rest position of FIG. 2 to the capping position of FIG. 3, the illustrated service station 45 uses the motor and gear assembly 82 to drive the pallet 85 through rack gear 84 in the direction of arrow 88. The sled 90 includes an activation bar 96, which when the sled 85 moves in the direction of arrow 88 eventually contacts either the cartridges 50, 52 or the carriage 40. Following this contact, further movement of the sled 85 in the direction of arrow 88 serves to elevate the sled 90 into a capping position, as shown in FIG. 3. The ferro-fluidic service station 80 also has a scraper bar 98, extending down from the service station frame 46, here, located adjacent the spittoon mouth 48.

The service station 80 has a ferro-fluidic capping and spitting system 100, constructed in accordance with the present invention to seal the printheads 54, 56. The sled 90 defines a cap seating recess 102, within which is received a magnetic element 104. Overlying the magnet 104 is a ferro-fluidic fluid 105 which is used to seal against the printheads 54, 56, with only the black pen 50 being shown for simplicity in the views of FIGS. 2 and 3. When the ferro-fluidic fluid 105 contacts the nozzle orifices of printheads 54, 56, the fluid covers them and prevents evaporation, similar to the way in which a waterbed conforms to the body of someone laying upon it.

The magnet 104 is preferably a magnetic element similar to those used to attach things to refrigerators, file cabinets and other metallic surfaces, such as those used for large magnetic advertising signs and the like. A simple bar magnet having a north pole and a south pole is not believed to be as effective as these "refrigerator" magnets. These refrigerator type magnets are commonly ferroplastics which are hot extruded past an alternating magnetic field. The resulting magnet has alternating north and south poles, such as shown in FIGS. 2 and 3 with the letters "N" for north, meaning a positive polarity, and "S" for south, meaning a negative polarity. The alternating north and south polarities, are indicated in the drawings as "+" for the north polarity, and "−" for the south polarity. In some implementations if a higher field strength is desired, rather than these plastic extruded refrigerator type magnets, electromagnets, ceramic magnets, metallic magnets, or multiple ceramic or metallic magnets may also be used. Injection molded magnets may also be used, with the magnet being magnetized either in the mold or at a later time. The magnet may also be constructed from an electrostatic material and then perhaps configured as a tape. However, the refrigerator type magnets are preferred because they may be easily stamped to a desired shape or configuration for easily conforming with the recess 102 on the sled 90. Indeed, these magnets may be stamped in special shapes which allow them to be easily snapped into place to mate with mounting features formed on the sled 90.

FIGS. 4–8 illustrate an alternate form of a ferro-fluidic capping and spitting system 110, constructed in accordance with the present invention for sealing one or more inkjet printheads, such as the black printhead 54 of pen 50 when used in conjunction with a drum printer 112. The drum printer 112 feeds a sheet of media 114 through a print zone 115 using a rotating drum 116, rather than the media handling system 26 described above with respect to FIG. 1. Here, drum 116 grips the media 114, such as by using vacuum forces or mechanical linkages (not shown), then rotates the media in the direction of arrow 118 past the printhead 54, similar to the way in which the drive rollers of the media handling system 26 move a sheet of media through the printzone 25 for passage under the printheads 54, 56.

The printheads in the drum printer system 112 may be either a page wide array, or one or more printheads which reciprocate across the printzone 115, as described above with respect to printer 20. It is apparent that other mechanisms and sub-systems described above with respect to printer 20 may also be present in the drum feed printer assembly 112, such as: a positional feedback mechanism using an optical encoder system and a controller, such as controller 36; and media supply and output mechanisms, such as trays 28 and 32; as well as the ability to move the pen 50 with a carriage, such as carriage 40, back and forth across printzone 115 if discrete pens are used rather than a page wide array printhead.

The drum printer mechanism 112 is preferably a high speed printing mechanism printing at over 100 pages per minute which may require highly volatile inks; however, the concepts described herein for the ferro-fluidic capping system 100, 110 are believed to be feasible with other kinds of inks, such as hot-melt ink systems, or phase change inks made of waxes and other polymers. In the drum-feed printer 112, highly volatile inks require a very good capping system to prevent these inks from drying the nozzles. These highly volatile inks also require spitting at frequent intervals to prevent drying in the nozzles. To assist in drying these inks, the printed media may be buffered at the output for additional manipulation.

Ferro-fluidic fluids may be obtained from different sources, such as Ferrofluid, Inc. of Nashua, New Hampshire, U.S.A. Ferro-fluidic fluids, such as those used for the capping assembly 105 have various interesting properties. It is believed that a large number of tiny magnetic and magnetically permeable particles are suspended in the ferro-fluidic liquid 105. These particles are believed to not settle out, or sink with gravity, because they are effectively given an electric charge that prevents such agglomeration. Dispersants may be also used to prevent agglomeration of the magnetic particles in the ferro-fluid. Yet when the ferro-fluidic fluid 105 is placed in a magnetic field, or in a magnetic field gradient, such as provided by magnet 104, it is believed that if these magnetic particles have a sufficiently high permeability, the fluidic magnetic particles attempt to move to locations where the magnetic field directs them toward. It is believed that the fluidically suspended magnetic particles would separate out of the fluid and move toward the magnet if possible, and it is believed that this action is where the electrostatic repulsion forces come into play. Thus, the magnetic particles suspended in the fluid 105 remain within the liquid due to the forces of mutual repulsion between these particles, but the fluid in bulk is attracted to poles of magnet 104 since the particles are also attracted to magnet 104.

Figure 5:
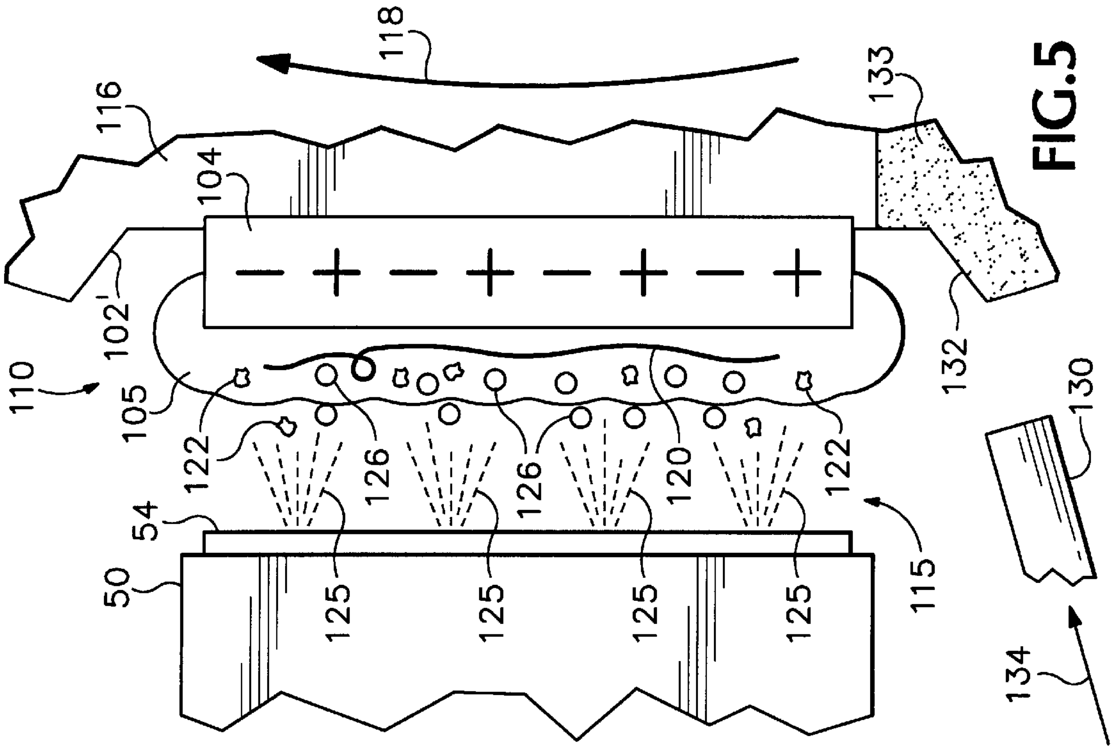
FIG. 5 is an enlarged side elevational view of the ferro-fluidic servicing station of FIG. 4 shown receiving ink spit from the printhead.
Figure 4:
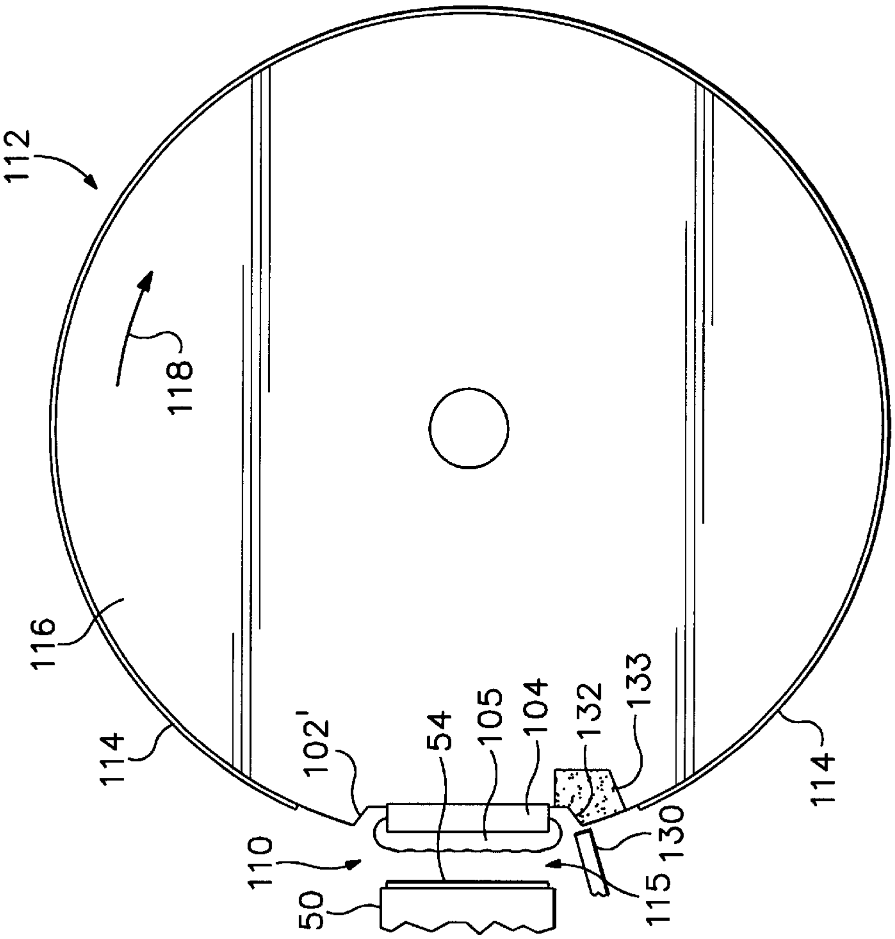
FIG. 4 is a schematic side elevational view of an alternate form of a ferro-fluidic servicing station shown prior to capping in the environment of a drum-fed inkjet printing mechanism which holds the print media, e.g. paper, on the surface of a drum that rotates to move the media past a printhead.
Figure 6:
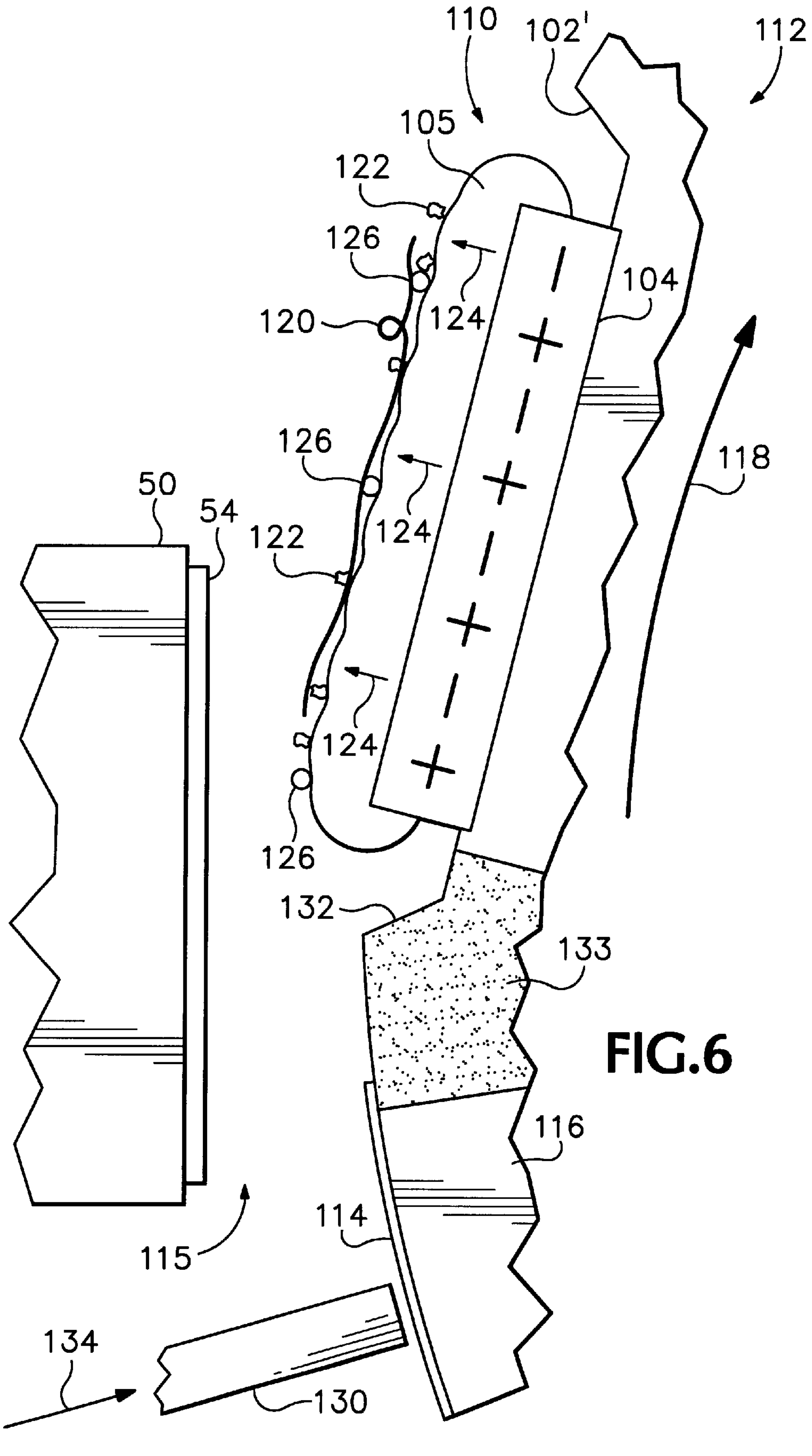
FIG. 6 is an enlarged side elevational view of the ferro-fluidic servicing station of FIG. 4, shown leaving the printhead after the spitting routine just prior to the beginning of a printjob.

The net effect is that the ferro-fluidic fluid acts like a high surface energy material, although there is an extent to which it has a magnetically-enhanced apparent viscosity as well, a property which makes some ferro-fluids well suited for use in experimental clutches. In a high surface energy material, van der Waals forces, which are electrostatic and in some cases quantum mechanical forces, continually pull molecules from the exterior of the ferro-fluidic fluid 105 toward the interior of the liquid. Similarly, a ferro-fluidic particle in fluid 105 is continually drawn toward the magnet 104. This is particularly advantageous for the capping process, where various debris, such as ink particles, dust, paper fibers, fabric fibers, hairs, etc. may accumulate on the printhead. By analogy, suppose that a hair or paper fiber fell into a drop of mercury, which is a high surface energy material. The mercury assumes a more spherical shape to reduce its surface area and minimize its potential energy. Similarly, as shown in FIG. 5, the ferro-fluidic magnetic particles that fluid 105 is composed of are more attracted to the magnet 104 than a hair 120 or other debris, such as ink particles 122, are attracted. The ferro-fluidic particles suspended within fluid 105 tend to flow around and under the hair 120 and ink particles 122, in a direction toward the magnet 104. The hair 120 and debris particles 122 are rejected from the bulk of the ferro-fluid, as shown in FIG. 6 by arrows 124, indicating the transition of the hair and debris 120, 122 from being within the fluid 105 as shown in FIG. 5, to being expelled to the surface of the ferro-fluidic fluid in FIG. 6.

Ferro-fluidic fluids have been used in other applications, such as for making vacuum seals. One interesting use of ferro-fluidic fluids has been for sealing against the rotating portions of disk drives. Another use for ferro-fluidic fluids is in sealing the mechanical access ports to high vacuum chambers, where several stages of ferro-fluidic seals are used. Ferro-fluidic fluids have also been used in audio speakers to enhance performance. These known uses for ferro-fluidic fluids and their current optimization lend themselves well to the use of ferro-fluidic fluids in capping systems 100, 110. The high vacuum uses for the ferro-fluidic fluids require an ultra-low vapor pressures and ultra-low evaporation rates, features which are desired in an inkjet printhead capping system 100, 110, as shown in FIGS. 2 through 8.

Besides sealing an inkjet printhead, the ferro-fluidic capping systems 100 and 110 may also be used for spitting, as shown in FIG. 5, to replace or augment the conventional spittoons for receiving ink spit from the printheads, as described in the Background section above. In FIG. 5 we see a schematic representation of ink 125 being spit from four representative nozzles of the printhead 54. As described above for the hair 120 and the particulate debris 122, the ink droplets impacting the ferro-fluidic fluid 105 and falling therein bead up in small spheres 126, or these spheres of ink droplets may not penetrate the surface of fluid 105, and instead, rest on top of the ferro-fluidic fluid 105. The ink droplets 126 entering the fluid are expelled by the ferro-fluidic fluid, as shown in FIG. 6 in the direction of arrow 124, as described above for the hair and other debris 120, 122.

This ferro-fluidic fluid 105 rejection of the ink droplets 126 is believed to occur through the following three mechanisms. First, if the ink 125 was polar and the ferro-fluidic fluid 105 was non-polar, then the ink is attracted to itself and beads up, as shown for the ink spheres 126. Second, if the ink 125 was non-polar and the ferro-fluidic fluid 105 was polar, the ferro-fluidic fluid 105 is attracted to itself, again causing the ink to bead up as shown for spheres 126. Thirdly, in either case, the ferro-fluidic fluid is attracted to the magnet 104 and the ink droplets 126 are excluded from the ferro-fluidic fluid 105 in the direction of arrows 124.

Now that the ink spittle spheres 126 from printhead 54 are sitting on top of the ferro-fluidic fluid 105, as shown in FIG. 6 along with the other contaminants 120 and 122, the ferro-fluidic cap 100, 110 is preferably cleaned prior to sealing the printhead 54, to avoid pushing these contaminants into the nozzles. After rotation of the drum 116 in the direction of arrow 118, for a nearly full rotation in the illustrated embodiment, the liquid cap 110 encounters a cap scraper member 130. The cap scraper 130 is positioned to skim across the ferro-fluidic fluid 105 and remove the contaminants 120, 122 and the ink droplets 126 from the surface of the ferro-fluidic fluid, and to deposit these contaminants and droplets in a collection region, such as region 132 in FIG. 8. Optionally, the collection region may be fully or partially lined with an absorbent member 133, which may be constructed of a liquid absorbent material, such as of a felt, pressboard, open cell foam sponge or other material known to those skilled in the art.

Figure 7:
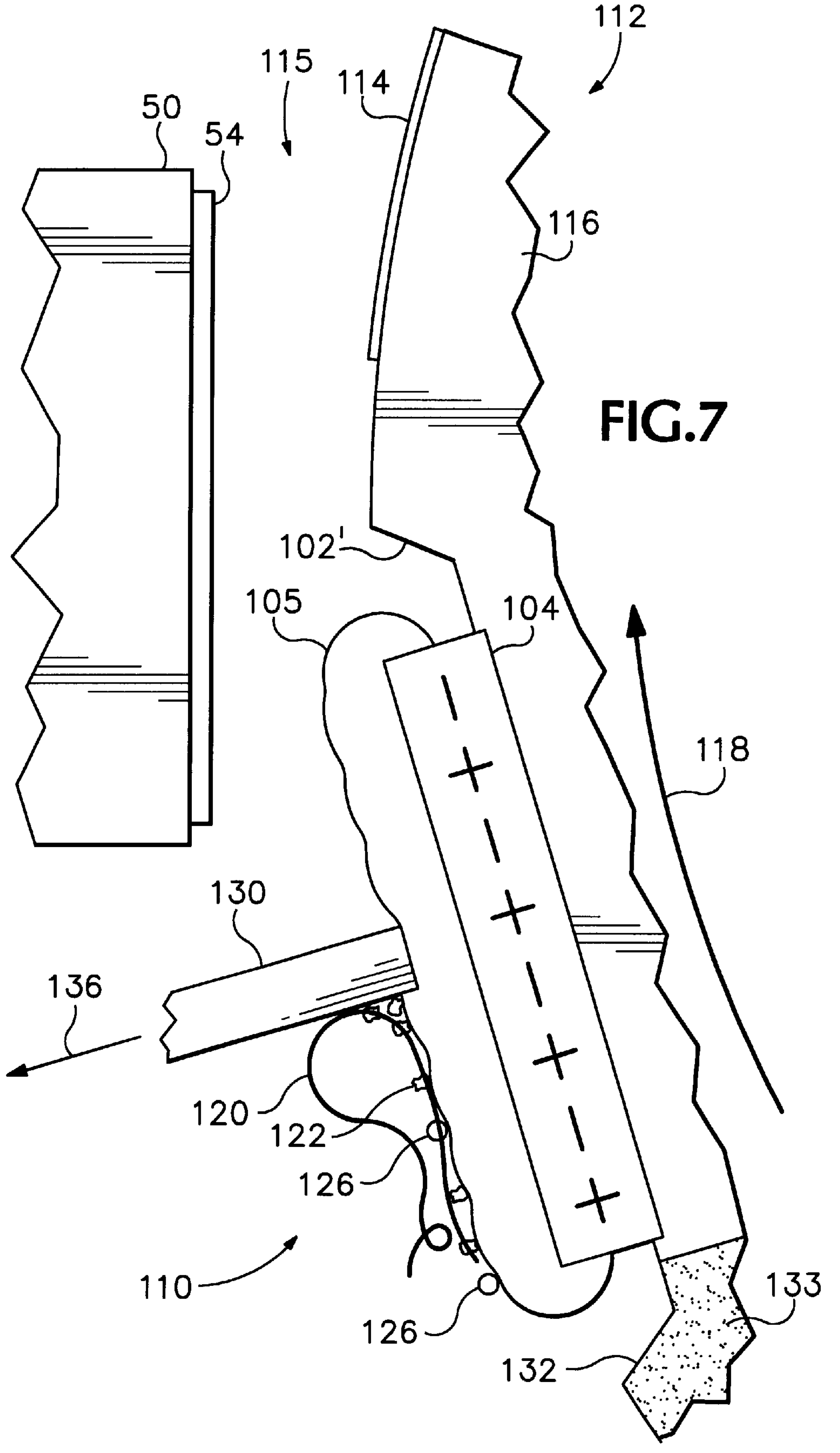
FIG. 7 is an enlarged side elevational view of the ferro-fluidic servicing station of FIG. 4, shown during the operation of cleaning ink residue and other debris from the printhead cap just prior to capping.
Figure 8:
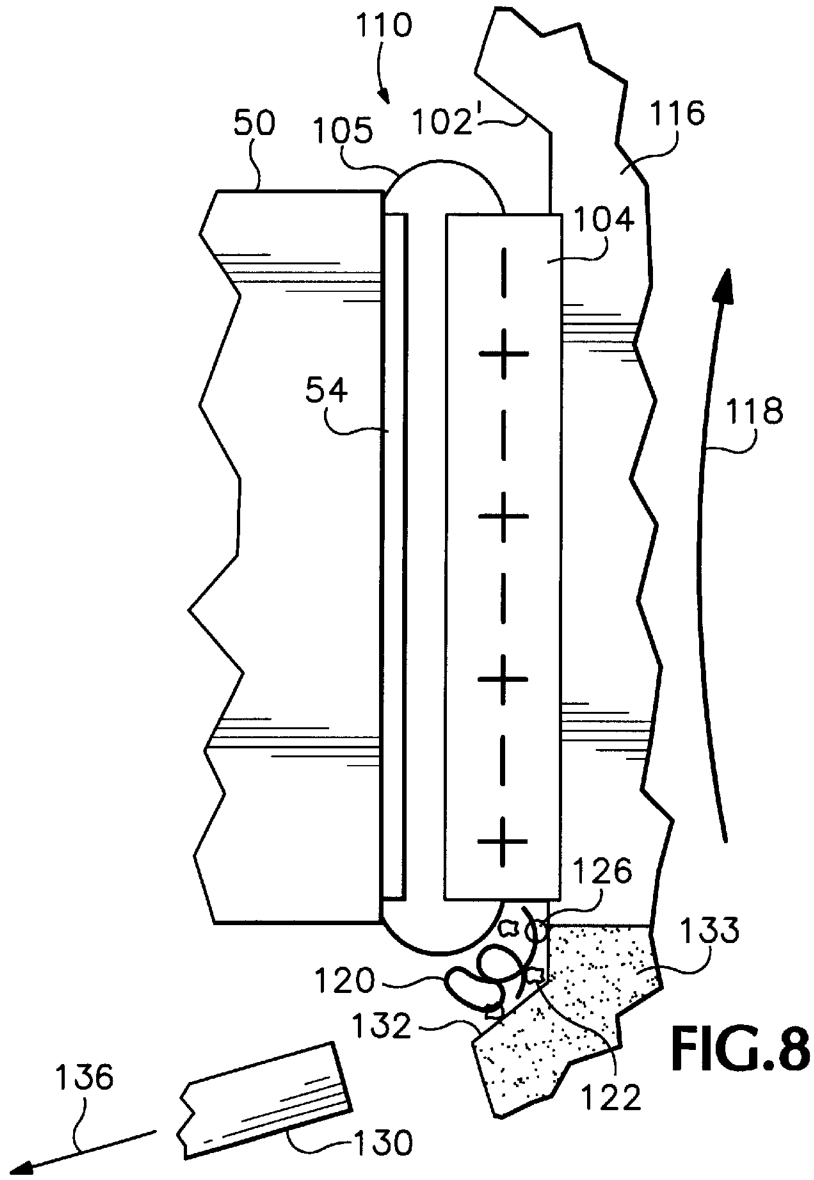
FIG. 8 is an enlarged side elevational view of the ferro-fluidic servicing station of FIG. 4 shown capping the printhead.

In FIG. 8, the printhead 54 has been sealed against the ferro-fluidic fluid 105, by bringing either the printhead into contact with the ferro-fluidic fluid, or by elevating the ferro-fluidic cap 110 into contact with the printhead 54, or by moving both printhead 54 and the cap 105 into mutual engagement. A variety of different mechanisms for achieving the capping position of FIG. 8 are known to those skilled in the art, such as ramps, levers, and solenoids, pneumatic actuators and other such mechanisms, etc., which are all known to those skilled in the art. In the translational sled embodiment of FIGS. 2 and 3, cap scraping is achieved by disengaging the capping unit 100 from printheads 54, 56, then moving the printheads out of the servicing region 44, which then allows the pallet 85 to move in the direction of arrow 88 to pass the cap scraper 98 over the surface of the ferro-fluidic fluid 105, achieving the same cleaning action as shown in FIG. 7. Besides removing unwanted debris 120, 122 and ink droplets 126 from the ferro-fluidic fluid 105, the scraper members 130, 98 also assist in removing any ink stalagmites that might otherwise build up on the surface of the ferro-fluidic fluid, from the ink spit 126 coagulating thereon.

The material used for the ferro-fluidic cap scraper 98, 130 may be a high surface energy, high melting point plastic, such as NORYL, supplied by the General Electric Company of Schenectady, N.Y. The tip of the cap scraper 98, 130 may be notched or it may contain wicking paths to move the ink droplets 126 away from the tip, as first used for wiper scrapers in the Hewlett-Packard Company's DeskJet 850C model color inkjet printer, or as used on the wipers of the Hewlett-Packard Company's PhotoSmart color photo inkjet printer. Alternatively, the tip of the cap scrapers 98, 130 may have a rake like configuration, or be of a fine mesh to scoop or skim the solid particulates 120, 122 and ink globules 126 across the surface of the ferro-fluidic fluid 105, to ensure that all of these particulates are captured on the scraper 98, 130. Additionally, the scraper members 98, 130 may be made partially or fully of an absorbent material, such as of a cellulosic fiber, or a sintered polyurethane foam, having wicking paths formed therein to allow the ink droplets 126 to move away from the wiper tip through capillary forces, while the volatiles within the ink droplets 126 dry, leaving only solid residue within the absorbent scraper.

Focusing on the drum printer embodiment 112 of FIGS. 4–8, it was mentioned above that to achieve very high throughput, for instance, on the order of over 100 sheets per minute, the printheads may require the use of highly volatile inks. In such a high speed drum printer, it is believed that the printheads 54, 56 would be required to spit onto the ferro-fluidic cap 105 around two or three times per second to keep every nozzle ready to fire. Thus, every few minutes the drum 116 may need to stop and move more slowly to allow the scraper 130 to be moved into a scraping position, as indicated by arrow 134 (FIGS. 5 and 6), to remove the ink droplets 126 and other debris 120, 122 from the ferro-fluidic cap 110. Following the scraping operation of FIG. 7, the scraper 130 is moved radially away from the drum 116, as indicated by arrow 136. When the drum printer 112 is turned off, the cap 110 is first scraped as shown in FIG. 7, and then moved into the capping position of FIG. 8. Preferably, the printheads 54, 56 move radially a few millimeters toward the drum 116 and into contact with the cap 110 to seal the printhead with the ferro-fluidic fluid 105. A variety of different mechanisms may be used to bring the printhead and cap 110 into mutual sealing contact, including moving the cap radially outward into contact with a stationary printhead, or by moving both the cap and printhead until they engage. Indeed, the capping station may be located at a fixed servicing location in the printer, entirely away from the drum 116, with the printhead being serviced, for instance, using service station 45 or other activation mechanisms known to those skilled in the art to bring the cap and printhead into mutual sealing contact.

Figure 9:
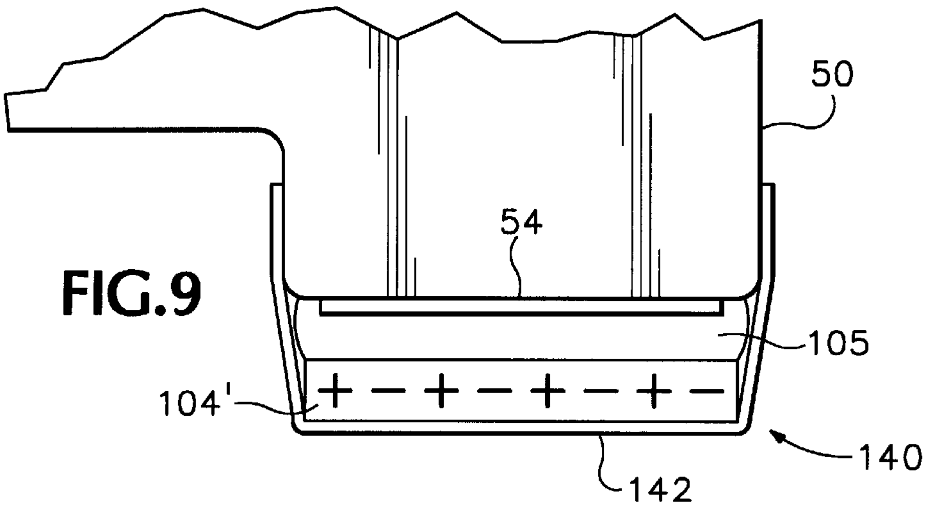
FIG. 9 is a schematic side elevation view of a printhead which may be sealed during shipment with a ferro-fluidic sealing asembly.

Having discussed a variety of different ways to seal the printhead with the ferro-fluidic caps 100, 110 when the printhead is installed in an inkjet printing mechanism 20, 112, other uses exist for this ferro-fluidic sealing process. For example, as shown in FIG. 9, a printhead, such as the black printhead 54 of pen 50, may be sealed during shipment with a ferro-fluidic sealing assembly 140, constructed in accordance with the present invention. Here we have an adhesive tape 142 to which is adhered a magnetic material 104', which may be described above for the magnetic material 104. Overlying the magnetic material 104' is a ferro-fluidic liquid 105, which is held in place to seal against the printhead 54 by the adhesive tape 142. In this transport sealing implementation 140, rather than using the refrigerator type magnet described above for the caps 100, 110, it may be preferable to use a more flexible magnetic material, such as the magnetic material used in audio or video recording tapes, or other magnetic recording mediums.

The ferro-fluidic sealing process may lend itself to an even lower cost variation of the transport seal shown in FIG. 9 by eliminating the adhesive tape 142, and perhaps even the magnetic material 104'. It is believed that the ferro-fluidic fluid 105 can be applied to the printhead in such a manner as to force the fluid up into the nozzles where it will remain under capillary forces just as ink does in today's inkjet cartridges. While the ferro-fluidic fluid 105 remains in the nozzles, evaporation is eliminated so the fluid 105 alone acts as a cap during shipping. While a non-ferro-fluidic liquid seal might be used by some, unfortunately such a seal could only be removed through a spitting and/or wiping process. A significant advantage of the ferro-fluidic cap is that fluid 105 may be removed from the nozzles of a cartridge by the magnetic attraction provided by the magnet 104 when the cartridge is installed in the printer, alleviating the need for a consumer to remove an adhesive tape seal.

Figure 10:
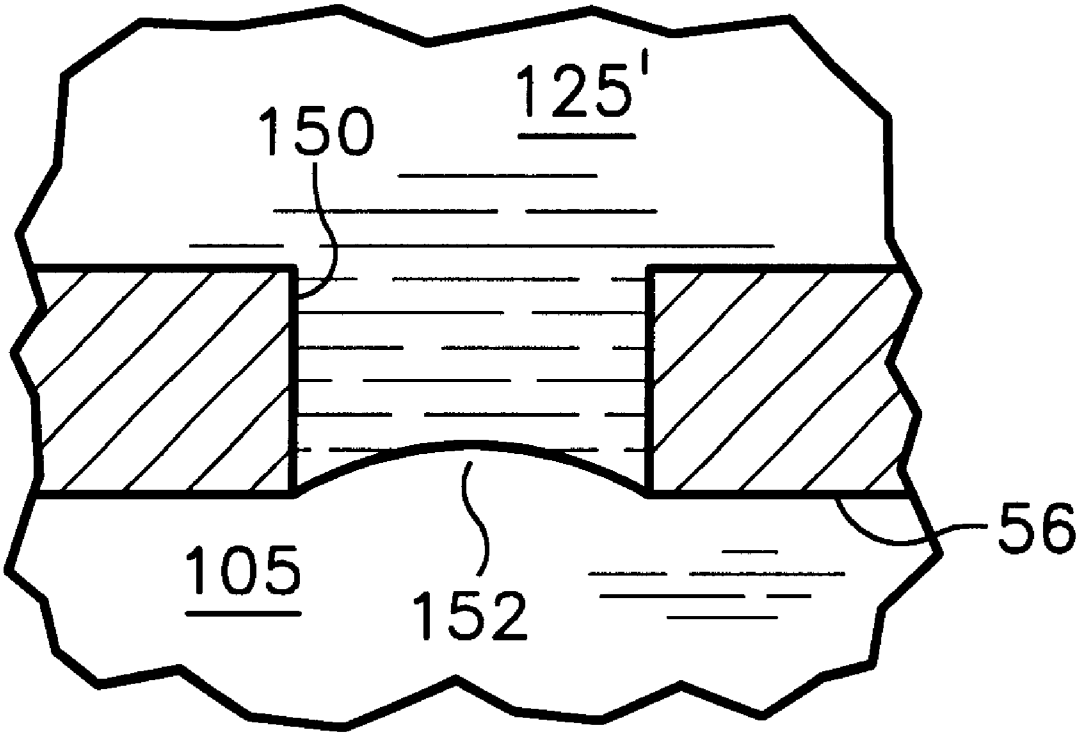
FIG. 10 is an enlarged, side-elevational view of the way in which a ferro-fluidic fluid of the present invention seals a printhead nozzle.

Before discussing the manner in which the ferro-fluidic fluid 105 seals the printhead nozzles under varying conditions with respect to FIG. 10, a discussion of the mechanics of the ferro-fluidic materials is in order, following a brief look at one of the earliest attempts to seal printhead nozzles. Inkjet printing originated with black ink printheads being the first to be developed. Soon after came the advent of multicolor printheads, such as predecessors of printhead 56, which dispensed cyan, magenta and yellow inks. Early attempts to seal the black printheads involved pushing a flat elastomeric sheet directly against the printhead orifice plate. When a flat elastomeric cap is pressed directly against an orifice plate, small capillary passageways between the orifice plate and the elastomeric sheet induced ink to wick out of the nozzles and travel to the outer boundaries of the cap/orifice plate interface. Upon reaching these outer boundaries where the ink was now exposed to the surrounding air, the volatile components of the ink would evaporate, leaving solid ink residue between the cap and the orifice plate. This solid ink residue then served to build more capillary paths along where the residue contacted the orifice plate, and along where the residue contacted the elastomeric sheet. These additional capillary paths created by the solid residue leftover from ink which had previously escaped then induced more ink to wick from the nozzles and travel to the outer boundaries of the cap/orifice plate interface where it evaporated. This unfortunate leakage cycle soon caused significant quantities of the solid ink residue to accumulate on the orifice plate, leading to all the typical problems associated with orifice contamination.

Cross contamination of the colors also became an issue when sealing multicolor printheads with a flat elastomeric cap. When this flat elastomeric sheet is pressed directly against orifice plate, small capillary passageways are formed between the orifice plate and elastomeric sheet. Under capillary forces, ink wicks out of the nozzles and into these capillary passageways, often traveling over to adjacent nozzles, which in the case of the multicolor printhead may lead to cross contamination and mixing of the ink colors, or even having one color leach up into the nozzles for another color. Thus, when printing is commenced, the resulting image is printed with unpure colors which have been muddied through this cross contamination.

The ferro-fluidic fluid capping system 100, 110, 140 avoids this cross contamination and provides a particularly superior seal when either a non-polar ferro-fluidic fluid 105 is used with a polar ink, or a polar ferro-fluidic fluid 105 is used with a non-polar ink. Some examples of various polar fluids include water, glycol, isopropyl alcohol, and polyethylene glycol ("PEG"). Indeed, many current inkjet inks are water-based. Some examples of non-polar materials include oil, gasoline, polypropylene, and waxes. It is known that molecules have an intrinsic distribution of charge across the molecule, in effect, a collection of electrostatic dipoles and often best seen as a single electrostatic dipole. Molecules which are more polar in nature have a greater attraction for one another than they do for less polar oriented molecules. Even solids, like an inkjet orifice plate, have varying surface constituents which appear more or less polar to an ink molecule. The electrons at the surface of a conductive orifice plate tend to mirror the charge of the polar molecules, and, because it is well known that opposites attract, the orifice plate molecules appear to the ink molecules as another adjacent polar molecule which attracts the polar ink molecule. For non-metallic orifice plates, the electron distributions of the surface molecules together define the property of surface energy.

FIG. 10 illustrates what is believed to happen when either a non-polar ferro-fluidic fluid 105 is used with a polar ink, or a polar ferro-fluidic fluid 105 is used with a non-polar ink, here with the ink labeled as item number 125'. In FIG. 10 we see the ferro-fluidic fluid 105 has conformed to seal a printhead nozzle 150, forming a meniscus 152. In this case, the ferro-fluidic fluid 105 is slightly over-pressured, and pushes the meniscus 152 into nozzle 150, which advantageously prevents any ink from wicking out of nozzle 150 through capillary forces. Thus, in this best case scenario, the ferro-fluidic capping system 100, 110, 140 provides a nozzle seal which is far superior to not only the early elastomeric sheet caps discussed briefly above. Because evaporation is completely inhibited, the ferro-fluidic capping system 100, 110, 140 is also superior to the cup-type elastomeric caps which surround large sets of printhead nozzles with a hermetic chamber.

If the ferro-fluidic cap liquid is pressed deeper into the nozzle, there may be other advantageous effects. For instance, if the ferro-fluidic fluid may exclude settling particles. The ferro-fluidic fluid may also be used to protect printhead components from inks that would chemically attack them over long storage periods. If the ferro-fluidic fluid did press deeper into the nozzles than shown in FIG. 10, the uncapping process may need to proceed more slowly to allow ink to fill the area being vacated by the ferro-fluidic fluid. Any ferro-fluidic fluid remaining in the nozzles can then be purged through the spitting process.

Conclusion

Thus, there are a variety of advantages that can be realized using the ferro-fluidic capping and spitting system 80, 110, along with the ferro-fluidic transport sealing system 140 for sealing a new inkjet cartridge during shipment from the factory before it is first installed in a printing mechanism. For example, in the context of the inkjet printers 20, 112, there is no longer the need for expensive onsert molding of elastomeric caps onto the sleds 90, or onto the drum 116, as needed in the earlier capping systems. Furthermore, there is no need to relieve internal cap pressure using a costly narrow vent path, which often required special materials or additional parts to make the vent path function for the lifetime of a printer. Moreover, the ferro-fluidic capping system, by keeping the orifice plate freer of in contamination and by decreasing the evaporation rate from the nozzles, may also serve to reduce or eliminate the need for wiping the printhead as is required by the earlier inkjet printers.

Furthermore, given the nature of the ferro-fluidic fluid 105, there is a zero evaporation rate of the ink from the printheads 54, 56, particularly when using a non-polar ferro-fluidic fluid 105 with a polar ink. Additionally, the ferro-fluidic fluid 105 provides a total shielding of the printhead nozzles from environmental factors, such as changes in pressure, relative humidity, evaporation over time, and other environmental changes. These environmental changes affected printheads using the earlier elastomeric caps, or required special elastomeric cap design to address these issues, such as vent paths, diaphragms, capillary passageways and the like. Moreover, use of the ferro-fluidic caps 100, 110 allows for a relaxing of tolerances in the printer 20, that is, the component parts no longer need to be made with such great precision as in current inkjet printers because the ferro-fluidic fluid 105 acts as a pillow or cushion, and when thick enough, absorbs these various tolerances so more economical parts may be used to assemble the inkjet printers 20, 112. Also, given the looser tolerances, it may be possible to eliminate the lifting motion of the cap to the pen, allowing the printhead to glide over the surface of the fluid 105 into, and out of, the capping position. Such a system advantageously reduces both the cost and size of both the service station and printer.

Another advantage realized in an inkjet printer 20 using multiple printheads dispensing different colors of ink is the total avoidance of cross-contamination of the inks in the capping unit. This zero cross-contamination factor allows the printhead nozzles of different colors to be packed closer together, yielding a printer with a smaller "footprint," that is, the amount of space required on a desk or other work surface to seat the printer. Since there can be no fluid path between nozzles of different colors, there is no danger that one color with a lower back pressure inside the cartridge will draw ink from the reservoir of a neighboring nozzle. Additionally, the ferro-fluidic capping system may enable different configurations of nozzles where the colors are no longer separated into columns of similar type.

A further advantage of the ferro-fluidic capping system 100, 110 is that there is no force required to compress an elastomeric cap to seal the printheads 54, 56, as required in the earlier inkjet printers. This lower capping force using the ferro-fluidic caps 100, 110 may allow smaller motors to be used in the service station, such as service station 45, leading to less expensive parts and perhaps more rapid operation. Additionally, particularly in the drum printer setting 112, the use of highly volatile inks is now facilitated using ferro-fluidic capping system 100, 110. For example, some of these highly volatile inks may include XYLENE, isopropyl alcohol (IPA), and methyl ethyl ketone (MEK) solvent type inks to be used. It is apparent that the concepts discussed herein may be implemented in a variety of different ways in the context of an inkjet printing mechanism, only a few of which are discussed above, without departing from the principles of the ferro-fluidic system as claimed below. For instance, while the ferro-fluidic system has been illustrated with respect to a reciprocating printhead printer 20 and a drum feed printer 112, it is apparent that other printing configurations, such as a belt feed printer, may also make use of the ferro-fluidic system as claimed below.

We claim:

1. A ferro-fluidic capping system for sealing nozzles of an inkjet printhead, with the nozzles ejecting ink having either polar properties or non-polar properties, the ferro-fluidic capping system comprising:

a support structure engageable with the printhead;

a magnetic element supported by the support structure; and a ferro-fluidic fluid overlaying the magnetic element to seal against the printhead nozzles when the support structure is engaged with the printhead, with the ferro-fluidic fluid selected to have polar properties when the ink has non-polar properties, and to have non-polar properties when the ink has polar properties.

2. A ferro-fluidic capping system according to claim 1 wherein the support structure comprises a capping sled in an inkjet printing mechanism to seal the nozzles of said inkjet printhead when installed therein.

3. A ferro-fluidic capping system according to claim 1 wherein the ferro-fluidic fluid is located by the support structure in an inkjet printing mechanism to receive ink spit from the nozzles of said inkjet printhead when installed therein.

4. A ferro-fluidic capping system according to claim 1 wherein the support structure comprises an adhesive tape structure which engages the printhead through adhesive bonding to seal the nozzles of said inkjet printhead before installation in an inkjet printing mechanism.

5. A ferro-fluidic capping system according to claim 4 wherein the magnetic element is of a flexible magnetic material.

6. A ferro-fluidic capping system according to claim 1 wherein the magnetic element is of a ferroplastic magnetic material which was formed through a hot extrusion process while passing through an alternating magnetic field to gain alternating north and south magnetic poles.

7. A ferro-fluidic capping system according to claim 1 wherein the magnetic element is an electromagnet.

8. A ferro-fluidic capping system according to claim 1 wherein the magnetic element is of a ceramic magnetic material.

9. A ferro-fluidic capping system according to claim 1 wherein the magnetic element is of a metallic magnetic material.

10. A ferro-fluidic capping system according to claim 1 for sealing nozzles ejecting ink having polar properties, wherein the ferro-fluidic fluid has non-polar properties.

11. A fluidic capping system for sealing ink-ejecting nozzles of an inkjet printhead, comprising:

a support structure engageable with the printhead; and a fluid supported by the support structure to seal against the printhead nozzles when the support structure is engaged with the printhead, with the fluid selected to expel ink residue ejected thereon from the printhead;

wherein said fluid comprises a ferro-fluidic fluid, and the capping system further includes a magnetic element sandwiched between the ferro-fluidic fluid and the support structure.

12. A fluidic capping system according to claim 11 for sealing nozzles ejecting ink having polar properties, wherein the ferro-fluidic fluid has non-polar properties.

13. A fluidic capping system according to claim 11 wherein the ferro-fluidic fluid is selected to expel particulate debris accumulating therein to an exterior surface of the fluid.

14. A method of sealing of an inkjet printhead during periods of inactivity, with nozzles ejecting ink having either polar properties or non-polar properties, comprising the steps of:

covering the nozzles with a ferro-fluidic fluid selected to have polar properties when the ink has non-polar properties, and to have non-polar properties when the ink has polar properties; and magnetically biasing the ferro-fluidic fluid during the covering step.

15. A method according to claim 14 further including the step of securing the ferro-fluidic fluid against the printhead by adhesive bonding during the covering step.

16. A method according to claim 15 wherein:

the magnetically biasing step comprises the step of sandwiching the ferro-fluidic fluid between the printhead and a magnetic element; and the securing step comprises the step of securing both the magnetic element and the ferro-fluidic fluid to the printhead using an adhesive tape.

17. A method according to claim 14 further including the steps of:

uncovering the nozzles with the ferro-fluidic fluid;

thereafter, spitting ink from the nozzles onto the ferro-fluidic fluid; and magnetically biasing the ferro-fluidic fluid during the spitting step.

18. A method according to claim 17 further including the steps of:

after the spitting step, expelling the ink deposited onto the ferro-fluidic fluid to an exterior surface of the ferro-fluidic fluid; and thereafter, scraping the expelled ink from the exterior surface of the ferro-fluidic fluid.

19. A method according to claim 14 further including the steps of:

supporting the ferro-fluidic fluid with a support structure engageable with the printhead when installed in an inkjet printing mechanism; and during the covering step, engaging the support structure with the printhead when installed in said inkjet printing mechanism.

20. A method according to claim 19 wherein the magnetically biasing step comprises the steps of supporting a magnetic element with the support structure, and sandwiching the ferro-fluidic fluid between the printhead and the magnetic element.

21. A method of handling ink spit from an inkjet printhead, with the ink having either polar properties or non-polar properties, comprising the steps of:

providing a spit target located to receive ink spit from the printhead, with the spit target comprising a surface of a ferro-fluidic fluid selected to have polar properties when the ink has non-polar properties, and to have non-polar properties when the ink has polar properties;

spitting ink from the printhead onto the surface of the ferro-fluidic fluid; and magnetically biasing the ferro-fluidic fluid during the spitting step.

22. A method according to claim 21 further including the steps of:

following the spitting step, receiving at least some of the ink spit from the printhead within the ferro-fluidic fluid; and thereafter, expelling the ink received within the ferro-fluidic fluid to the exterior surface thereof.

23. A method according to claim 22 further including the step of, following the expelling step, scraping the expelled ink from the exterior surface of the ferro-fluidic fluid.

24. An inkjet printing mechanism, comprising:

a frame;

a support structure supported by the frame;

an inkjet printhead having nozzles which eject ink having either polar properties or non-polar properties;

a magnetic element supported by the support structure; and a ferro-fluidic fluid overlaying the magnetic element, with the ferro-fluidic fluid selected to have polar properties when the ink has non-polar properties, and to have non-polar properties when the ink has polar properties.

25. An inkjet printing mechanism according to claim 24 wherein the ferro-fluidic fluid is located by the support structure to receive ink spit from the nozzles of the inkjet printhead.

26. An inkjet printing mechanism according to claim 25 further including a cap scraper supported by the frame to remove ink spit received by the ferro-fluidic fluid therefrom.

27. An inkjet printing mechanism according to claim 24 wherein:

the support structure is engageable with the printhead; and the ferro-fluidic fluid seals against the printhead nozzles when the support structure is engaged with the printhead.

28. An inkjet printing mechanism according to claim 27 wherein:

the ferro-fluidic fluid receives ink spit from the nozzles of the inkjet printhead; and the inkjet printing mechanism further includes a cap scraper supported by the frame to remove ink spit received by the ferro-fluidic fluid therefrom.

29. An inkjet cartridge for installation in an inkjet printing mechanism, comprising:

a reservoir;

ink contained in the reservoir, with the ink having either polar properties or non-polar properties;

a printhead having nozzles for ejecting the ink from the reservoir; and a removable ferro-fluidic sealing assembly sealing the nozzles, including:

a support structure removably engageable with the printhead;

a magnetic element supported by the support structure; and a ferro-fluidic fluid overlaying the magnetic element and sealing the nozzles when the support structure is engaged with the printhead, with the ferro-fluidic fluid selected to have polar properties when the ink has non-polar properties, and to have non-polar properties when the ink has polar properties.

30. An inkjet cartridge according to claim 29 wherein the support structure comprises an adhesive tape structure which engages the printhead through adhesive bonding.

31. An inkjet cartridge according to claim 30 wherein magnetic element is of a flexible magnetic material.

32. An inkjet cartridge according to claim 29 wherein:

the ink has polar properties; and the ferro-fluidic fluid has non-polar properties.

33. An inkjet cartridge according to claim 29 wherein the magnetic element is of a ferroplastic magnetic material formed through a hot extrusion process while passing through an alternating magnetic field to gain alternating north and south magnetic poles.

34. An inkjet cartridge according to claim 29 wherein:

the reservoir comprises a plural chamber reservoir, with at least two of said plural chambers of the reservoir containing different colors of ink; and wherein said ferro-fluidic fluid prevents mixing of said two different colors of ink at the nozzles.

* * * * *